Sept. 4, 1934.　　　　　H. BORNHEIM　　　　　1,972,677
DAMPER
Filed May 11, 1933
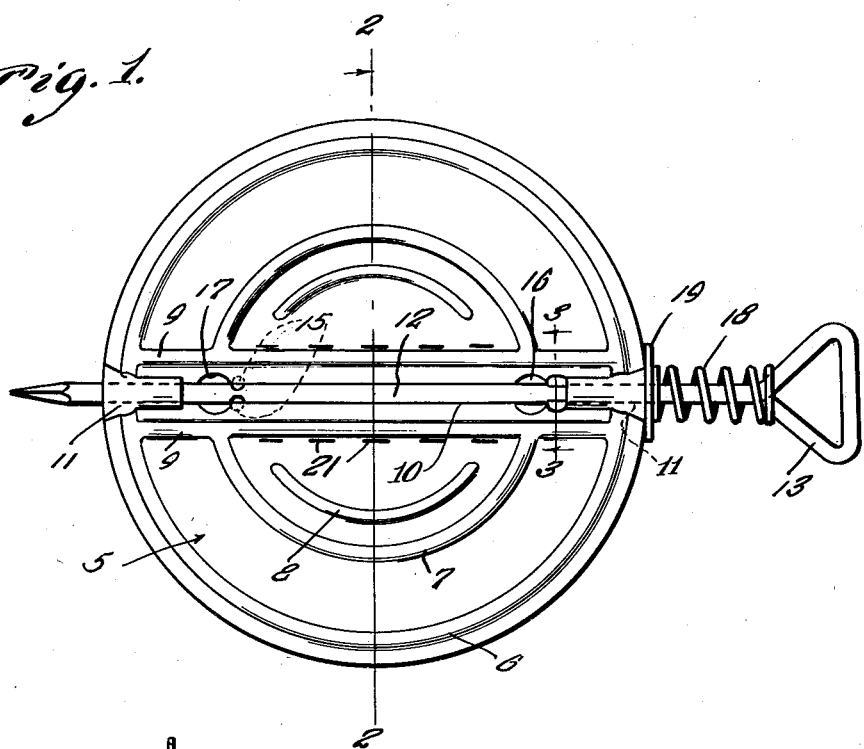
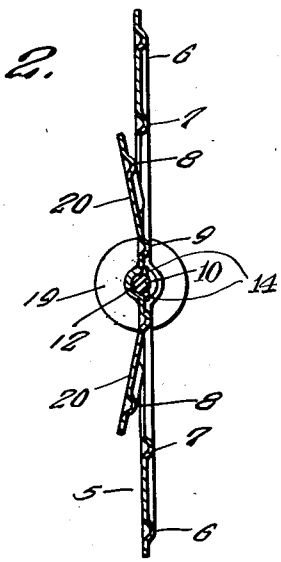
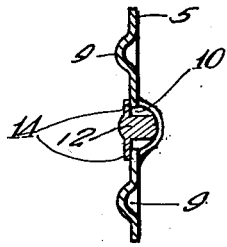
Inventor
Henry Bornheim
By Clarence A. O'Brien
Attorney Patented Sept. 4, 1934

1,972,677

UNITED STATES PATENT OFFICE 1,972,677

DAMPER

Henry Bornheim, Everett, Mass., assignor to David Gilman, Malden, Mass.

Application May 11, 1933, Serial No. 670,564

1 Claim. (Cl. 126—292)

This invention relates to dampers of the type used for producing a draft in chimney flues and the object of the invention is to improve upon the types of dampers now generally employed, and which dampers are objectionable where oil burners are used as being dangerous and bothersome since their construction is such as to cause undesirable odors from the burner when the damper is closed too tightly.

In accordance with the present invention a damper is provided wherein provision is provided to take care of the gaseous fumes even when the damper is in closed condition and thereby overcome the objections to the dampers now in use which are usually of a solid type and have no provision for the escape of the fumes.

The invention together with its numerous objects and advantages will be apparent from a study of the following description, taken in connection with the accompanying drawing wherein:

Figure 1 is a plan view of the damper, and

Figures 2 and 3 are sectional views taken substantially on the lines 2—2 and 3—3 respectively of Figure 1.

Referring to the drawing by reference numerals it will be seen that the damper indicated by the reference numeral 5 comprises a disk or circular plate formed of metal or other suitable material and in the present instance having pressed therefrom ribs 6, 7, 8, and 9 for reinforcing purposes.

The ribs 9 are disposed at relatively opposite sides of the transverse center of the damper and the portion of the damper between the ribs 9 has pressed outwardly from one side thereof an elongated groove 10 while at each end of the groove the material of the damper has pressed from the face thereof opposite to the groove 10 shorter grooves 11 which are flared at the peripheral edge of the damper plate as shown. The grooves 10 and 11 accommodate the shank of the spindle 12 and at one end thereof the spindle is pointed, while at its relatively opposite end it is provided with a head 13.

The spindle 12 has pressed out therefrom a pair of locking lugs or ears 14 disposed at one side of the longitudinal median of the spindle, and a second pair of ears 15 longitudinally spaced from the ears 14 and disposed at that side of the longitudinal median of the shank of the spindle opposite to the ears 14. For accommodating the ears 14, 15 the plate 5 adjacent the end grooves 11 is provided with apertures 16, 17. Disposed about the head or handle equipped end of the spindle 12 is a coil spring 18 that has one end seated against the handle 13 and a relatively opposite end seating against a plate 19 that bears against the peripheral edge of the damper 5.

As is thought apparent, with the parts in the position shown in Figure 1 the ears 14 on the spindle engage one side of the damper plate 5 adjacent the opening 16, while the ears or lugs 15 engage the side of the damper plate 5 opposite to the lugs 14 and in proximity to the aperture 17 so that the damper plate and spindle are held against relative rotation.

Spring 18 acts on the spindle and plate for normally urging them in reverse directions relative to one another, this movement of the spindle and plate being limited by engagement of the ears 14 with the inner end of the adjacent one of the grooves 11, the arrangement of the grooves 10, 11, and of the apertures 16, 17, being to facilitate assembling of the device, the manner of assembly being thought apparent.

A salient feature of the present invention also resides in providing the plate 5 at opposite sides of the groove 10 with wings 20 which are formed by slitting the plate along the inner sides of the ribs 7 with the slits extending from one end to the other of the respective ribs 7; and also perforating the plate 5 as at 21 on lines adjacent to and paralleling the ribs 9, the portions or the wings 20 being thus bendable on the lines of perforations 21 outwardly from the plane of the plate 5 in a manner suggested in Figure 2 thus providing openings in the damper plate to take care of the fumes when the damper is in a closed position. It will thus be seen that when desired the parts 20 of the plate may be bent into position for closing the openings defined by the ribs 7 and 9, or bent out of the plane of the plate to either side of the plate for presenting apertures through which the fumes from the oil burner may escape through the flue. Obviously the lugs 14 and 15 are engaged with the plate 5 in a manner to cause the plate to rotate with the spindle 12 when the latter is manipulated for opening, closing or otherwise adjusting the position of the damper.

It will also be apparent that a damper of this character can be cheaply and economically constructed and will be of sufficient strength and durability.

To apply the spindle to the damper in the flue, the pointed end of the spindle is passed through a suitable opening in the flue and then into the grooves 10, 11 and forced against the power of the spring 18 until the ears or lugs 14, 15 coincide with the apertures 16, 17. The spindle 12, in practice, is inserted with the ears or lugs 15 passing through the apertures 16 from one side to the opposite side of the damper 5, the spindle being then forced against the power of the spring until the lugs or ears 14, 15 coincide with the apertures 16, 17. At this point a half rotation is given to the spindle, the lugs 14, 15 passing through the slots 16, 17, and the spindle is then released with the result that the lugs 14 are forced into engagement with the inner end of right hand groove portion 11 while the lugs or ears 15 are forced into engagement with the left hand end of the groove portion 10 with, as shown in Figure 1, the lugs 14 being disposed at one side of the damper 5 and the lugs 15 being disposed at a relatively opposite side of the damper thus locking the spindle to the damper for rotation of the damper with the spindle.

Having thus described my invention, what I claim as new is:

In a damper of the character described, the combination with a damper spindle provided near each end thereof with oppositely extending lateral retaining lugs pressed therefrom; of a damper plate having a central elongated groove, opening at one side of the plate, relatively short end grooves alined with the first named groove and opening at the opposite side of said plate, said grooves receiving said spindle, and said plate adjacent opposite ends of the first named groove being provided with openings through which the said lugs on the spindle are adapted to pass when the spindle is rotated and to engage the damper plate when the spindle is locked, with the lugs adjacent one end of the spindle engaging one side of the plate, and the lugs at the opposite end of the spindle engaging an opposite side of the plate; said plate at opposite sides of said grooves having reinforcing ribs pressed therefrom extending transversely of the plate, and spaced concentric arcuate ribs including outer arcuate ribs merging with the transverse ribs at the ends of the latter, and inner arcuate ribs merging with the transverse ribs inwardly from the ends of the latter, said plate being also slit on arcuate lines at the inner side of the inner arcuate ribs, and also being perforated at one side of the transverse ribs between the ends of said inner arcuate ribs; the portions of the plate within the confines of the inner arcuate ribs and the transverse ribs being bendable to either side of the plate along the lines of perforation to provide openings for the plate and segmental wings for controlling said openings.

HENRY BORNHEIM.